(12) United States Patent
Brandic et al.

(10) Patent No.: US 11,973,201 B2
(45) Date of Patent: Apr. 30, 2024

(54) IMPACT DETECTION DEVICE FOR A TRACTION BATTERY OF A MOTOR VEHICLE AND MOTOR VEHICLE WITH AN IMPACT DETECTION DEVICE

(71) Applicants: AUDI AG, Ingolstadt (DE); Dr. Ing. h.c. F. Porsche Aktiengesellschaft, Weissach (DE)

(72) Inventors: Ilija Brandic, Pleidelsheim (DE); Markus Grupp, Unterreichenbach (DE); Julius Rausch, Heilbronn (DE); Oliver Stoll, Waldbrunn (DE)

(73) Assignees: AUDI AG, Ingolstadt (DE); DR. ING. H.C. F. PORSCHE AKTIENGESELLSCHAFT, Weissach (DE)

( * ) Notice: Subject to any disclaimer, the term of this patent is extended or adjusted under 35 U.S.C. 154(b) by 234 days.

(21) Appl. No.: 17/696,442

(22) Filed: Mar. 16, 2022

(65) Prior Publication Data
US 2022/0302512 A1     Sep. 22, 2022

(30) Foreign Application Priority Data
Mar. 17, 2021   (DE) .......................... 102021106545.3

(51) Int. Cl.
*H01M 10/48*     (2006.01)
*B60L 3/00*      (2019.01)
(Continued)

(52) U.S. Cl.
CPC ........... *H01M 10/48* (2013.01); *B60L 3/0046* (2013.01); *H01M 10/425* (2013.01); *B60R 21/0136* (2013.01)

(58) Field of Classification Search
CPC .. H01M 10/48; H01M 10/425; H01M 50/242; B60R 21/0136
(Continued)

(56) References Cited

U.S. PATENT DOCUMENTS

2020/0161717 A1* 5/2020 Fritz .................. H01M 10/613

FOREIGN PATENT DOCUMENTS

| CN | 111204205 A | 5/2020 | |
| DE | 102013014358 A1 * | 3/2015 | ........... B60R 19/483 |

(Continued)

OTHER PUBLICATIONS

Search Report dated Jul. 25, 2022 in parallel European Patent Application No. 22154869.6 (6 pages).
(Continued)

*Primary Examiner* — Drew J Brown
*Assistant Examiner* — Tiffany L Webb
(74) *Attorney, Agent, or Firm* — STAAS & HALSEY LLP

(57) ABSTRACT

An impact detection device for a traction battery of a motor vehicle includes at least one air-filled chamber formed on an underbody element for the traction battery. An air-filled chamber is at least laterally sealed to outside and defined by a sealing material. A pressure hose and an introduction element for the pressure hose can be provided, wherein the air-filled chamber can be coupled to a pressure sensor through the pressure hose, and the introduction element can be attached to the underbody element and formed to couple the pressure hose to the air-filled chamber through the sealing material in a set position. The introduction element can be embedded by the sealing material which seals the air-filled chamber.

19 Claims, 2 Drawing Sheets

(51) Int. Cl.
*B60R 21/0136* (2006.01)
*H01M 10/42* (2006.01)

(58) Field of Classification Search
USPC .......................... 296/187.03; 307/10.7; 73/37
See application file for complete search history.

(56) References Cited

FOREIGN PATENT DOCUMENTS

| DE | 102014203255 A1 * | 8/2015 | ......... B60R 21/0136 |
|---|---|---|---|
| DE | 10 2015 103 904 A1 | 9/2016 | |
| DE | 102015103904 A1 | 9/2016 | |
| DE | 10 2016 122 288 A1 | 5/2018 | |
| DE | 10 2017 211 047 A1 | 1/2019 | |
| DE | 102017120739 A1 | 3/2019 | |
| DE | 10 2018 129 158 A1 | 5/2020 | |
| DE | 102019119996 A1 | 1/2021 | |
| DE | 102021106166 A1 * | 9/2022 | |
| DE | 102021103862 B4 * | 11/2022 | ............ B60L 3/0007 |

OTHER PUBLICATIONS

Examination Report dated Sep. 1, 2021 in corresponding German Patent Application No. 102021106545.3 (5 pages).
Chinese Office Action issued in Chinese Application No. 202210262183.9 dated Aug. 30, 2023.

* cited by examiner

IMPACT DETECTION DEVICE FOR A TRACTION BATTERY OF A MOTOR VEHICLE AND MOTOR VEHICLE WITH AN IMPACT DETECTION DEVICE

CROSS-REFERENCE TO RELATED APPLICATIONS

This application claims the benefit of German Application No. 10 2021 106 545.3, filed on Mar. 17, 2021, in the German Intellectual Property Office, the disclosure of which is incorporated herein by reference in its entirety.

BACKGROUND

Described below is an impact detection device for a traction battery of a motor vehicle as well as to a motor vehicle with such an impact detection device.

Nowadays, many motor vehicles are partially or fully electrically formed, for example as a hybrid vehicle or as a purely electrically operated motor vehicle. Therein, a drive battery or traction battery required thereto, which usually includes multiple battery cells, is mostly arranged in a floor area of the motor vehicle. This has the disadvantage that shocks from below directly hit the traction battery, which can result in damages to the traction battery. In order to limit or avoid damages by intrusion from below, it is known to use an underbody element for the traction battery, which can for example be formed as an underride guard, to protect the traction battery from direct force effect. Therein, the underbody element can be a trim on the underbody of the traction battery and/or of the motor vehicle, which shields the traction battery from environmental influences and/or mechanical influences.

However, an underbody element either does not keep all of the shocks away from the traction battery, and in case of severe shocks from below, for example upon bottoming out of the motor vehicle upon bollard passage, it can occur that the underbody element is pressed into the traction battery and thereby damages arise at the traction battery. That is, an intrusion of the traction battery can occur by an impact. In order that this type of damages can be determined and to minimize consequential damages to the motor vehicle and/or risks for a driver of the motor vehicle, detection of an impact on the traction battery is required to draw conclusions if battery cells of the traction battery have been damaged by an impact. That is, a sensing concept is required to be able to determine a shock and deformation of the traction battery, respectively.

In particular, sensing concepts have proven to be advantageous in other vehicle areas, which are able to indicate a deformation of the vehicle area and thereby an impact via a pressure change of an air pressure in an air-filled chamber.

Thus, from DE 10 2014 203 255 A1, a device for detecting a side impact of an object on a vehicle door of a motor vehicle is known. The device includes a vehicle door, which has a door outer side and a door inner side, which are connected to each other such that an air-filled door inner volume forms between them, as well as at least one sensor technology, wherein the sensor technology detects the door internal pressure in the door inner volume or a signal depending thereon, wherein the device further comprises at least one control unit, which is formed such that it generates a control signal for a protection device depending on the signals of the at least one sensor technology, wherein a door impact absorber is arranged on a side of the door outer side bounding the door inner volume, wherein a part of the sensor technology is arranged between door impact absorber and the door outer side and formed such that it detects a contact of an object with the door outer side in the area of the door impact absorber.

From DE 10 2013 014 358 A1, an impact detection unit for a vehicle is known. The impact detection unit includes a sensor unit, which comprises at least one pressure hose, which is arranged in a groove at least partially in a first vehicle component of a vehicle end area. Upon an impact, the sensor unit generates a corresponding pressure signal and outputs the pressure signal. An opening of the groove is oriented in vehicle vertical direction perpendicular to a vehicle longitudinal direction.

In contrast to the above mentioned vehicle areas, in the traction battery, the difficulty arises that only a limited installation space, in particular for the attachment of a pressure sensor, is available and that the air-filled chamber has to be sealed in defined manner to obtain reproducible pressure signal characteristics, which aggravates concepts for pressure transfer.

SUMMARY

Described below is a way to provide pressure sensing for a traction battery, which provides reproducible pressure signal characteristics.

An impact detection device for a traction battery of a motor vehicle is described. The impact detection device includes an underbody element for the traction battery, wherein a floor trim, in particular an underride guard, for the traction battery is meant herein, which can be arranged in the direction of a bottom side of the motor vehicle and/or the traction battery in an intended installation position in the motor vehicle and which provides at least a protective effect from external influences. Furthermore, the impact detection device includes at least one air-filled chamber, which can be formed on the underbody element and which can be at least laterally sealed to the outside and defined by a sealing material. The air-filled chamber can be sealed to the top and bottom by the underbody element and a bottom side of the traction battery. For example, a polyurethane seal can be used as the sealing material, which can be applied to the underbody element in a production process. In addition, the impact detection device includes a pressure hose and an introduction element for the pressure hose, wherein the chamber can be coupled to a pressure sensor via the pressure hose, and wherein the introduction element can be attached to the underbody element and formed to couple the pressure hose to the chamber through the sealing material in a preset position, wherein the introduction element can be embedded by the sealing material for sealing the chamber.

In other words, an introduction element can for example be fixed to the underbody element, in particular by a plug connection and/or an adhesive connection. For example, the introduction element can be produced by an injection molding method or a comparable method. After attaching the introduction element onto the underbody element, the pressure hose can be introduced into the introduction element, wherein the pressure hose can be coupled to a pressure sensor. Subsequently, the sealing material can be applied to the underbody element for forming the chamber, wherein the introduction element can be embedded by the sealing material. This means that the introduction element can represent a part of the sealing of the chamber to the outside. This has the advantage that the air-filled chamber can be impressed upon deformation of the underbody element, which results in a pressure change, which can be transferred to the pressure sensor, which can detect the pressure change, via the introduction element and the pressure hose. By detection of the pressure change, it can then be determined that an intrusion onto the traction battery has occurred.

By the use of the introduction element, it can be achieved that a pressure hose can be coupled to the air-filled chamber, whereby the pressure sensor can be arranged in spaced manner, which can be advantageous due to shortage of space at the traction battery. A further advantage, which arises by the use of the introduction element, is that the chamber can be sealed in defined manner by the sealing material and thus a reproducible pressure signal characteristic can be generated upon an impact and an intrusion of the underbody element, respectively. Without introduction element and with a sole introduction of the pressure hose through the sealing material, there would in particular be the risk of slipping of the pressure hose. Furthermore, sealing the chamber with sole use of the pressure hose can be aggravated, and gaps can arise in the seal, by which the pressure signal characteristic is influenced. Thus, the advantage overall arises that pressure sensing can be provided in simple manner, which has reproducible pressure signal characteristics and in which a pressure sensor can be arranged spaced from the air-filled chamber.

The described embodiments result in additional advantages.

An embodiment provides that the introduction element includes a basic body, by which a cylindrical passage channel for introducing the pressure hose is formed. The basic body can includes a rigid material and be produced by an injection molding method. In particular, a shape of the basic body can have the shape of a circular segment, thus on the top side of a circular arc, which can be delimited by a chord on the bottom side. Thus, the bottom side of the basic body of the introduction element can be flat, whereby the introduction element can be attached to the underbody element in form-fit manner. Furthermore, the introduction element can be particularly well embedded by the sealing material by the top side in circular arc shape, whereby it can be sealed in defined manner and gaps do not arise in the seal. A cylindrical passage channel can be formed through the basic body, in which the pressure hose can be introduced and fixed. By this embodiment, a particularly suitable configuration of the introduction element can be provided.

A stop for the pressure hose can be arranged in the passage channel. The stop can be provided so that the stop retains the pressure hose in the passage channel such that it abuts on the side of the chamber. The stop in the passage channel can for example be provided by a taper in the passage channel. Hereby, the advantage arises that the pressure hose can be arranged in the introduction element with a length predefined by the stop, whereby reproducible pressure signal characteristics can be achieved.

A further embodiment provides that an air-permeable filter element can be arranged in the introduction element, wherein the filter element is suitable as a dirt filter. In other words, a filter element, which can filter dirt, can be arranged in the introduction element, in particular in the passage channel of the introduction element. The filter element can be air-permeable such that a pressure can be transferred from the chamber to the pressure sensor via the pressure hose. By this embodiment, the advantage arises that dirt, which can in particular be present in the chamber of the underbody element, does not arrive at the pressure sensor, which could be damaged by the dirt, via the pressure hose.

The filter element can be formed as a grid structure. Herein, a grid structure can offer an inexpensive and simple dirt filter effect for coarse dirt particles. Furthermore, the pressure can be transferred to the pressure sensor via the pressure hose by the grid structure without the pressure being substantially influenced by the filter element.

A further embodiment provides that the introduction element includes a basic body, wherein the basic body includes a semi-cylindrical recess on a top side, which is formed as a fitting connection for the pressure hose. In other words, the pressure hose can be fitted onto the introduction element from above in this embodiment in that a basic body of the introduction element includes a semi-cylindrical recess on a top side. The pressure hose can be inserted or clamped into the semi-cylindrical recess, whereby the pressure hose can be retained in position. After attaching the pressure hose, the sealing material for sealing the chamber can be applied over the introduction element and the pressure hose. By this embodiment, a further advantageous configuration for pressure sensing and for retaining the pressure hose in a preset position can be achieved. By retaining the pressure hose in the preset position, thus, a reproducible pressure signal characteristic can be generated.

A further embodiment provides that the introduction element can be formed to couple the pressure hose to the chamber at a preset inclination angle, wherein the pressure hose is arranged obliquely downwards towards the chamber by the preset angle of inclination. In other words, the introduction element includes an introduction inclination obliquely downwards such that the pressure hose points obliquely downwards towards the chamber. This has the advantage that water, which can in particular arise by condensation of moisture at a cooling device of the traction battery, cannot flow through the pressure hose into the pressure sensor, but can flow off back into the chamber.

A further embodiment provides that the introduction element has a fixing device, which can be formed to fix the hose. Thus, the pressure hose and the fixing device can for example include a screw coupling or a flange, by which the pressure hose can be fixed in the introduction element. Alternatively, the fixing device can include a clamp, in particular a hose clamp, for fixing the pressure hose. By this embodiment, the advantage arises that the pressure hose can be securely fixed in the introduction element, whereby slipping can be prevented and thus a pressure signal characteristic can be obtained in reproducible manner.

A further embodiment provides that the introduction element can be attached to the underbody element by a plug connection and/or adhesive connection. Thus, the introduction element can for example be plugged onto the underbody element and additionally be adhered thereto. Thus, the introduction element can be attached in a predefined position for forming the chamber. This has the advantage that a production process of the underbody element can be simplified since the introduction element can be fixedly attached in a predefined position.

According to the invention, a motor vehicle with an impact detection device according to one of the preceding embodiments can also be provided. Herein, the same advantages and possibilities of variation as in the impact detection device arise. The motor vehicle can be configured as an automobile, in particular passenger car or truck, or as a passenger bus or motorcycle.

The described embodiments include developments of the motor vehicle, which include features as they have already been described in context of the developments of the impact detection device. For this reason, the corresponding developments of the motor vehicle including the described embodiments are not again described here.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
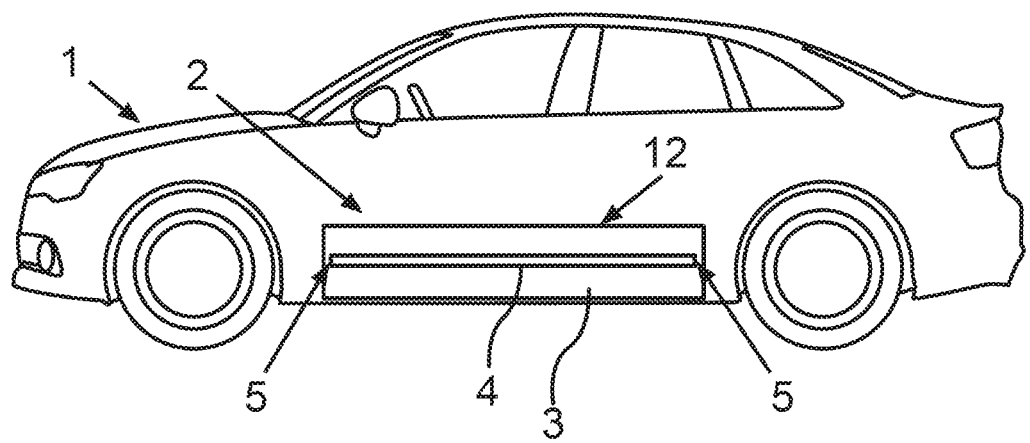
FIG. 1 is a schematized diagram of a motor vehicle with an impact detection device according to an exemplary embodiment.

In the embodiments, the described components of the embodiments each represent individual features, which are to be considered independently of each other, and be developed independently of each other. Therefore, the disclosure is to include also combinations of the features of the embodiments different from the illustrated ones. Furthermore, the described embodiments can also be supplemented by further ones of the already described features.

In the figures, identical reference characters each denote functionally identical elements.

In FIG. 1, a schematized diagram of a motor vehicle 1 with an impact detection device 2 according to an exemplary embodiment is illustrated. The motor vehicle 1 can for example be a passenger car, which is electrically operated. For energy supply, the motor vehicle 1 can include a traction battery 12 or drive battery, wherein the traction battery 12 can include multiple battery cells (not shown).

For protection of the traction battery 12 from shocks from below the motor vehicle 1, an underbody element 3, which can be formed as an underride guard, can be arranged below the attachment place of the traction battery 12. The underbody element 3 can be formed to protect the traction battery 12 from mechanical influences. However, it can occur that an intrusion of the traction battery 12 occurs due to a severe shock from below the motor vehicle 1, for example upon bottoming out on a curb. In order to determine an occurrence of the intrusion and to warn a driver of the motor vehicle 1 of a damage of the traction battery 12, therefore, the impact detection device 2 described below can be provided.

The impact detection device 2 can include the underbody element 3, which includes at least one or multiple air-filled chambers 4, which can be laterally circumferentially sealed to the outside by a sealing material 5. The air-filled chamber 4 can be bounded to the top and bottom by the underbody element 3 and the traction battery 12 and be sealed by them. The air-filled chambers 4 can change their volume upon deformation of the underbody element 3, whereby a pressure change of the air pressure in the chambers 4 occurs. This pressure change can be detected by a pressure sensor (not shown) to detect a shock and a deformation of the underbody element, respectively, and thereby a damage of the traction battery 12.

Figure 2:
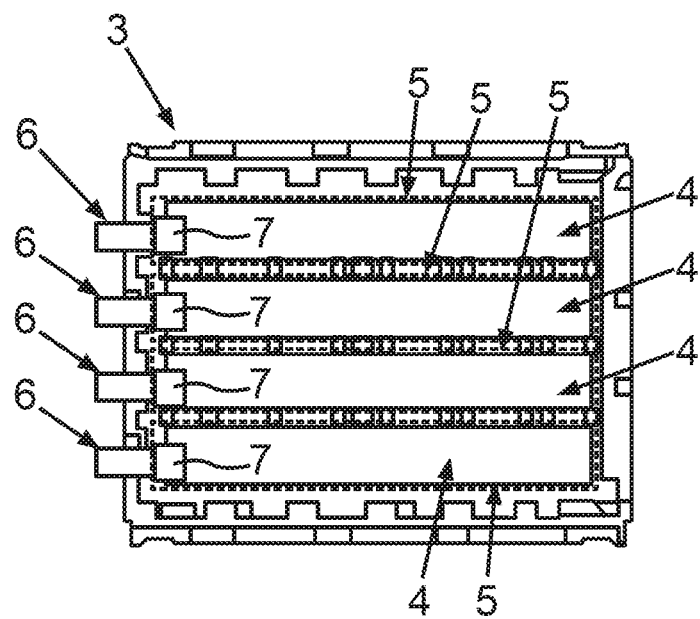
FIG. 2 is a top view to a schematized underbody element of an impact detection device according to an exemplary embodiment.

In FIG. 2, the underbody element 3 of the motor vehicle 1 is schematically illustrated in a top view from the direction of the traction battery 12. The underbody element 3 can include multiple air-filled chambers 4, which can be formed as extensive areas, wherein the battery cells of the traction battery 2 can be arranged above the chambers 4. As illustrated, the chambers 4 can be laterally circumferentially sealed by the sealing material 5, which can in particular be a polyurethane foam. In order that a reproducible and characteristic pressure signal can be determined, a good sealing of the chambers 4 should be achieved by the sealing material 5. It is problematic that the pressure sensor, which can be used for the detection of a pressure difference, has to be arranged spaced from the traction battery 12 and the underbody element 3 due to the limited space requirement at the traction battery 12. Therefore, it can be advantageous to transfer the pressure change from the respective chamber 4 to the spaced pressure sensor via one or more pressure hoses 6.

Herein, the difficulty can be in determining a passage for the pressure hose 6 into the respective chamber 4. A hose passage is technically implementable neither on the bottom side of the underbody element 3 nor on the top side of the chambers 4. With respect to installation space, thus, only the passage of the pressure hose 6 through the sealing extension of the sealing material 5 may remain, which may not be readily possible with respect to reproducibility and tightness. In particular, tightness of the chambers 4 and a reproducible attachment place can only difficultly be implemented in using the pressure hose 6 alone.

Therefore, an introduction element 7 can be provided, which can be attached to the underbody element 3, in particular by a plug and/or adhesive connection. The pressure hose 6 can be introduced into this introduction element 7 and fixed, whereby the pressure hose 6 is thereby connected to the chamber 4 in a preset position. The introduction element 7 can be embedded by the sealing material 5 for sealing the chamber 4 after attachment onto the underbody element 3. This means that the introduction element 7 forms a part of the lateral sealing of the chambers 4.

Figure 3:
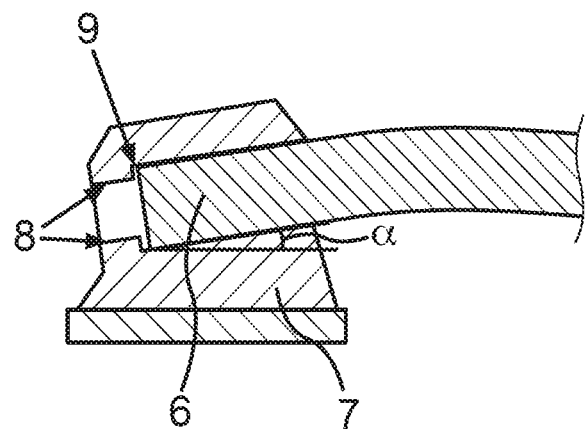
FIG. 3 is a lateral sectional view of a schematized introduction element according to an exemplary embodiment.

In FIG. 3, a lateral sectional view through a schematic representation of an introduction element 7 according to an exemplary embodiment is illustrated. In this embodiment, the introduction element 7 can include a basic body, by which a cylindrical passage channel for introducing the pressure hose 6 is formed. The passage channel cannot extend horizontally to the underbody element 3, but have a preset inclination angle α, such that the pressure hose 6 can be arranged obliquely downwards towards the chamber 4 in the introduction element 7. This has the advantage that condensed water can flow off back into the chamber 4 and does not arrive at the pressure sensor through the pressure hose 6.

Furthermore, a stop 8 for the pressure hose 6 can be arranged in the passage channel of the introduction element 7. Thus, the pressure hose 6 can be reproducibly and uniquely fixed. For fixing, a fixing device 9 can furthermore be provided, for example at the stop 8. The fixing device 9 can in particular include a screw thread, by which the pressure hose 6 can be screwed and thus coupled to the fixing device 9 in the introduction element 7. Thus, slipping of the pressure hose 6 from the introduction element 7 can be prevented.

Figure 4:
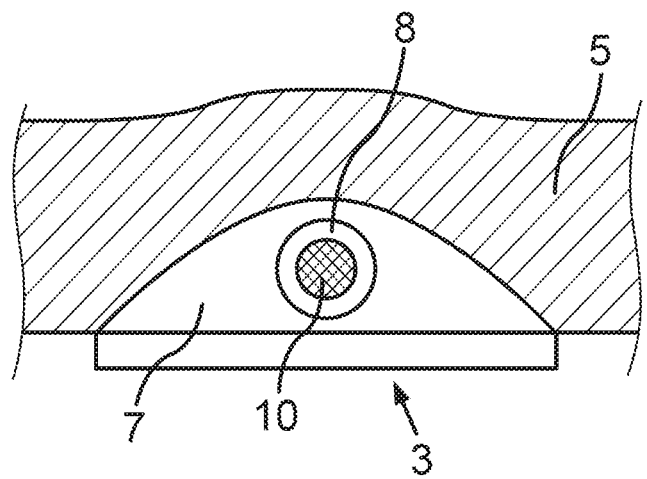
FIG. 4 is a frontal view of a schematized introduction element according to an exemplary embodiment.

In FIG. 4, a frontal view of the schematized introduction element 7 according to the exemplary embodiment from FIG. 3 is illustrated. As illustrated, the basic body of the introduction element 7 can have the shape of a circular segment, through which the cylindrical passage channel can be formed. In particular, a bottom side of the basic body of the introduction element 7 can be flat such that it can be connected, in particular adhered, to the underbody element 3 in improved manner. A top side of the basic body of the introduction element 7 can have a circular arc shape such that the introduction element 7 can be particularly suitably embedded by the sealing material 5. The stop 8 within the cylindrical passage channel can for example be formed as a taper, which is arranged circumferentially in the passage channel and can retain the pressure hose 6 in position. An air-permeable filter element 10 can be additionally arranged in the passage channel, wherein the filter element 10 is suitable as a dirt filter to thus reduce a dirt input through the pressure hose 6 to the pressure sensor. Thereto, the filter element 10 can for example be formed as a grid structure, which can keep the dirt particles with a preset size from penetrating into the pressure hose 6.

Figure 5:
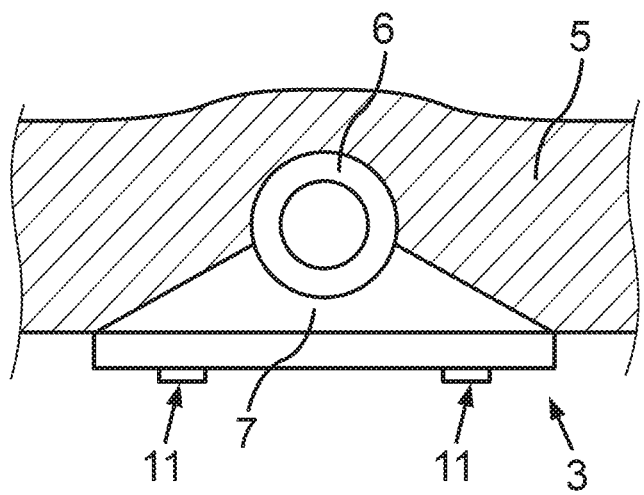
FIG. 5 is a frontal view of a schematized introduction element according to a further exemplary embodiment.

In FIG. 5, a frontal view of a schematized introduction element 7 according to a further exemplary embodiment is illustrated. The introduction element 7 illustrated here can include a basic body with a flat bottom side, on which a plug connection 11 for plugging onto the underbody element 3 can for example be provided. The top side of the basic body of the introduction element 7 can again be in circular arc shape, wherein a semi-cylindrical recess can additionally be provided on the top side, which can be formed as a fitting connection for the pressure hose 6. In this embodiment, the pressure hose 6 can be fitted from above onto the introduction element 7 for fixing. Subsequently, the sealing material 5 for sealing the air-filled chambers 4 can be applied onto the introduction element 7 and the pressure hose 6. Thus, sealing of the chambers 4 and positioning of the pressure hose 6 in a preset position can be achieved with the chamber 4.

Overall, the examples show how an introduction element 7 for a pressure hose 6 with defined insertion length and integrated grid structure 10 can be provided by the invention.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. An impact detection device for a traction battery of a motor vehicle with an underbody element for the traction battery, the impact detection device comprising:
   at least one air-filled chamber formed on the underbody element, an air-filled chamber, among the at least one air-filled chamber, being at least laterally sealed to outside by a sealing material;
   a pressure hose; and
   an introduction element,
      the air-filled chamber coupled to a pressure sensor through the pressure hose,
      the introduction element attached to the underbody element and formed to couple the pressure hose to the air-filled chamber through the sealing material in a set position, and
      the introduction element embedded by the sealing material which seals the air-filled chamber.

2. The impact detection device according to claim 1, wherein the introduction element comprises a basic body, by which a cylindrical passage channel for introducing the pressure hose is formed.

3. The impact detection device according to claim 2, wherein a stop for the pressure hose is arranged in the cylindrical passage channel.

4. The impact detection device according to claim 1, wherein an air-permeable filter element is arranged in the introduction element, wherein the filter element is suitable as a dirt filter.

5. The impact detection device according to claim 4, wherein the filter element is formed as a grid structure.

6. The impact detection device according to claim 1, wherein the introduction element comprises a basic body, wherein the basic body includes a semi-cylindrical recess on a top side, which is formed as a fitting connection for the pressure hose.

7. The impact detection device according to claim 1, wherein the introduction element is formed to couple the pressure hose to the air-filled chamber at an inclination angle, wherein the pressure hose is arranged obliquely downwards towards the chamber by the inclination angle.

8. The impact detection device according to claim 1, wherein the introduction element comprises a fixing device, which is formed to fix the pressure hose.

9. The impact detection device according to claim 1, wherein the introduction element is attached to the underbody element by a plug connection and/or adhesive connection.

10. A motor vehicle, comprising:
    a traction battery with an underbody element for the traction battery; and
    an impact detection device including,
       at least one air-filled chamber formed on the underbody element, an air-filled chamber, among the at least one air-filled chamber, being at least laterally sealed to outside by a sealing material,
       a pressure hose, and
       an introduction element,
          the air-filled chamber coupled to a pressure sensor through the pressure hose,
          the introduction element attached to the underbody element and formed to couple the pressure hose to the air-filled chamber through the sealing material in a set position, and
          the introduction element embedded by the sealing material which seals the air-filled chamber.

11. The motor vehicle according to claim 10, wherein the introduction element comprises a basic body, by which a cylindrical passage channel for introducing the pressure hose is formed.

12. The motor vehicle according to claim 11, wherein a stop for the pressure hose is arranged in the cylindrical passage channel.

13. The motor vehicle according to claim 10, wherein an air-permeable filter element is arranged in the introduction element, wherein the filter element is suitable as a dirt filter.

14. The motor vehicle according to claim 13, wherein the filter element is formed as a grid structure.

15. The motor vehicle according to claim 10, wherein the introduction element comprises a basic body, wherein the basic body includes a semi-cylindrical recess on a top side, which is formed as a fitting connection for the pressure hose.

16. The motor vehicle according to claim 10, wherein the introduction element is formed to couple the pressure hose to the air-filled chamber at an inclination angle, wherein the pressure hose is arranged obliquely downwards towards the chamber by the inclination angle.

17. The motor vehicle according to claim 10, wherein the introduction element comprises a fixing device, which is formed to fix the pressure hose.

18. The motor vehicle according to claim 10, wherein the introduction element is attached to the underbody element by a plug connection and/or adhesive connection.

19. A device, comprising:
- an air-filled chamber formed on an underbody element for a traction battery of a motor vehicle, the air-filled chamber being laterally sealed to outside by a sealing material;
- a pressure hose; and
- an introduction element embedded by the sealing material and formed to couple the pressure hose to the air-filled chamber through the sealing material, resulting in coupling of the air-filled chamber to a pressure sensor through the pressure hose.

* * * * *